United States Patent [19]
Hunter

[11] Patent Number: 5,773,043
[45] Date of Patent: Jun. 30, 1998

[54] EXTRUDER AND DIE ASSEMBLY FOR EXTRUDING SHAPED FOOD PIECES

[75] Inventor: Thomas B. Hunter, Collinsville, Ill.

[73] Assignee: Kerry Ingredients, Inc., Beloit, Wis.

[21] Appl. No.: 816,030

[22] Filed: Mar. 11, 1997

[51] Int. Cl.$^6$ .............................. A21C 11/16; A21C 11/10
[52] U.S. Cl. ............................ 425/311; 425/313; 425/464
[58] Field of Search ..................................... 425/311, 313, 425/142, 461, 464; 426/513, 518

[56] References Cited

U.S. PATENT DOCUMENTS

| | | | |
|---|---|---|---|
| 2,101,755 | 12/1937 | Rosenstone et al. | 425/311 |
| 2,676,552 | 4/1954 | Hunter et al. | 425/288 |
| 3,143,085 | 8/1964 | Gebhardt et al. | 425/311 |
| 4,080,137 | 3/1978 | McCarthy | 425/311 |
| 4,152,102 | 5/1979 | Sasiela et al. | 425/311 |
| 5,435,714 | 7/1995 | Van Lengerich et al. | 425/313 |
| 5,637,329 | 6/1997 | Abrams et al. | 425/142 |

FOREIGN PATENT DOCUMENTS

96/23422  8/1996  WIPO .................................... 426/512

*Primary Examiner*—Robert Davis
*Attorney, Agent, or Firm*—Griffin, Butler Whisenhunt & Szipl

[57] ABSTRACT

An extruder for producing a food piece in a shape of a natural food piece. The extruder has a pressure vessel for containing a mash, a manifold communicating with the pressure vessel, and at least one die and cutter assembly communicating with the manifold. The die and cutter assembly has an extrusion member with an extrusion wall, a closed extrusion end, an opened feed end attachable to the manifold, at least one extrusion die formed in the extrusion wall, and a tubular cutter member which is reciprocably slidable on the extrusion wall. An opened cutter end has at least one cutting surface. The improvement is where the extrusion die has a shape generally configured to a cross-sectional shape of the food piece and configured to provide a substantially constant transverse flow rate of the mash through the die at substantially all portions of the die. The cutter member is reciprocated at speeds sufficient that a pressure of the mash in the extrusion member is not substantially changed during a reciprocation. The cutting surface is configured to approximate the shape of the at least first one-quarter of the die first encountered by the cutting surface.

27 Claims, 8 Drawing Sheets

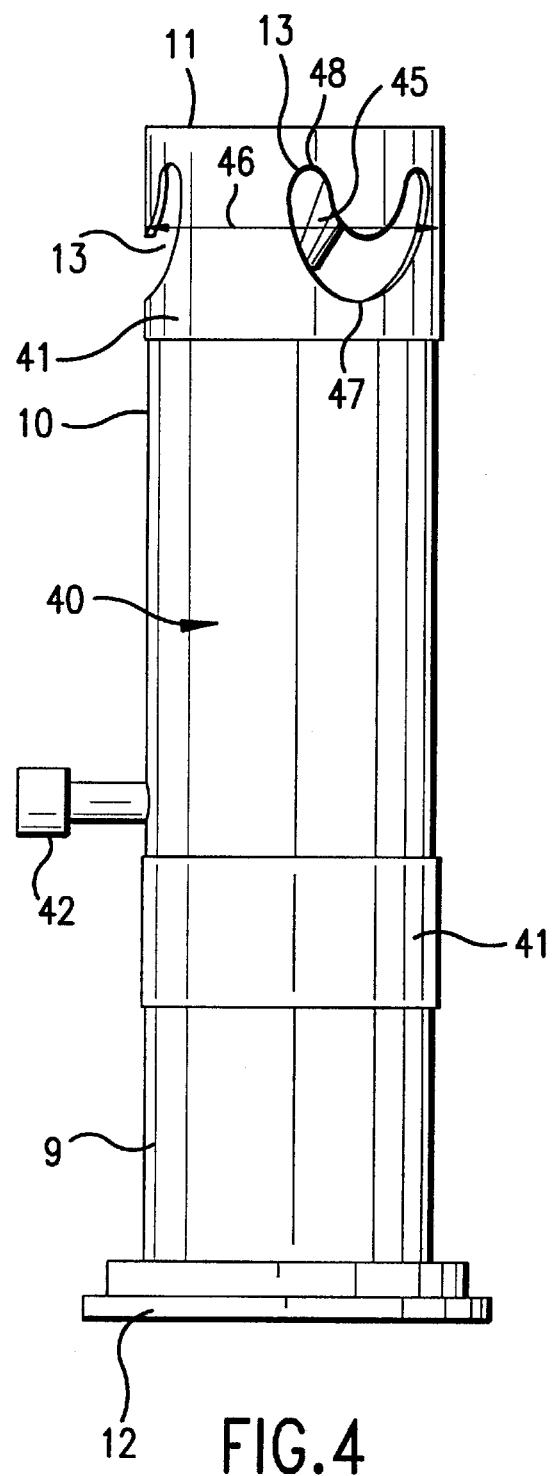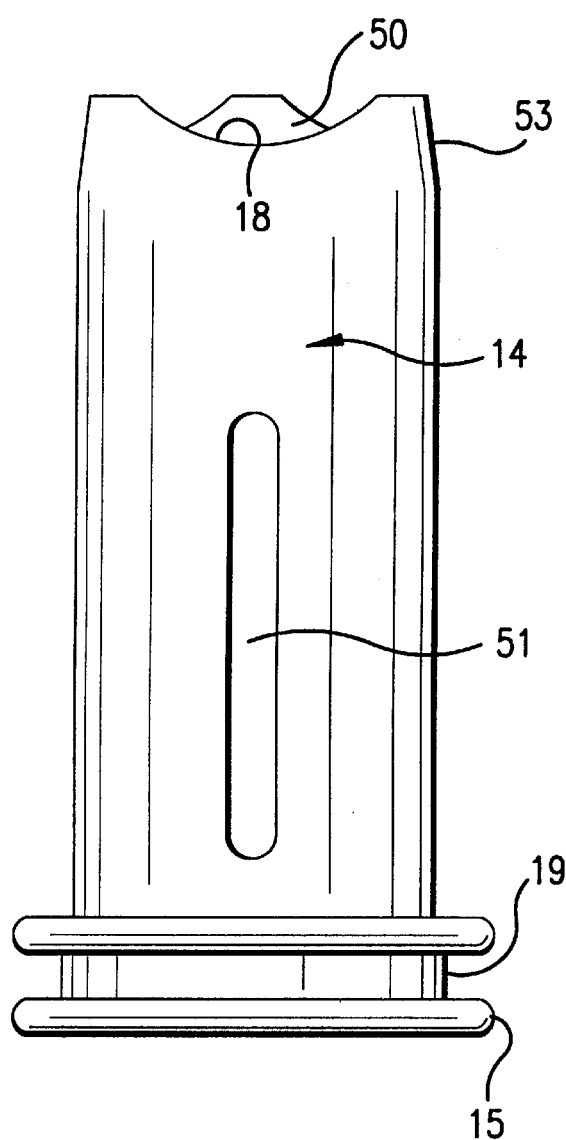

5,773,043

EXTRUDER AND DIE ASSEMBLY FOR EXTRUDING SHAPED FOOD PIECES

The present invention relates to an extruder and die assembly for extruding shaped food pieces, and more particularly to such extruder and die assembly where the shaped food pieces simulate the shape of a natural food piece, e.g. a shrimp or chicken part.

BACKGROUND OF THE INVENTION

Many foods are customarily eaten as an individual piece of that food. The piece may be a part of a natural food or the entire natural food may constitute the piece itself. For example, deep-fried shrimp, the entire natural food, are eaten as a single piece, while deep-fried chicken is eaten as a piece of that natural food, e.g. a drumstick. In some foods, the piece may be constituted by some designed subdivision of the natural food, such as cut strips of potato for preparing French fried potatoes. Irrespective of the origin of the piece, whether the entire natural food or a part of the natural food, it is expected by the consumer that the characteristic shape of that piece be present in the food to be consumed, and this expectation is very important to the satisfaction of the consumer. For example, while a potato may be cut into shapes significantly different from the traditional strips of French fried potatoes, if those shapes differ substantially from the traditional strips, the consumer would likely not consider that food French fried potatoes and would object to such shapes.

In many prepared foods, especially for institutional servings, fast food servings, and prepackaged servings, the natural variation in the size of the natural food piece cause considerable problems. For example, natural shrimp can vary considerably in size and, hence, causes variations in the processing of the deep-fried shrimp for institutional, fast food and prepackaged purposes. In addition, this causes difficulty in the finished cooking of those foods, since the natural variation in size causes differences in the initial requirements of processing prior to packaging (including freezing) and in the time required for reheating for finish frying, e.g. in a microwave oven or deep-fat frying.

Accordingly, it is a common practice in the art that such natural foods, e.g. shrimp, are ground into a mash and the mash extruded into a shape which simulates the natural shape of the shrimp. Since that extruded shape will be of a known size and weight, that extruded form of the shrimp can be processed (including freezing) and then subsequently reheated or cooked with insurance that the uniform size and weight will pass through the processing, reheating or frying with uniform results from piece to piece.

This method of processing food into an extruded shape is also used for convenience purposes, especially in snack foods. For example, chicken can be so processed through the mash and extruding steps to produce a miniature chicken drumstick, which, of course, has no bone, connective tissue and the like and is, therefore, quite useful as a finger food, such as hors d'oeuvres, light meals and the like.

Further, by preparing a mash of the food and extruding to the appropriate shape, quality control over the processed food is much easier, essential pasteurization can be assured, and portion sizes can be controlled, which is particularly important in certain institutional food and for certain fast food purposes, e.g. fast food restaurants, hospitals and the like.

However, considerable difficulties have been experienced in the art in producing such extruded food pieces, in that the art has not been able to faithfully reproduce the expected shape of the extruded food pieces. Basically, the prior art extruding processes involve grinding the food to an appropriate particle size, e.g. to pass through a U.S. Screen Series No. 10 screen, forming that ground food into a mash, usually with added water and gelling agents, and optionally formulated with other ingredients such as starch, cereals, flavors, preservatives, etc., and placing that mash in a pressure vessel which feeds a manifold upon which one or more die and cutter assemblies are mounted.

In the more modern arrangement, the die and cutter assembly, basically, is comprised of an inner sleeve (also referred to in the art as a nozzle) in fluid communication with the manifold through which the mash passes and an outer sleeve which is reciprocated relative to that inner sleeve for cutting extrudate into shaped pieces as the extrudate passes through a die in that inner sleeve. This basic process has been practiced for some time. In an earlier form thereof, the die was at the end of the inner sleeve and a cutter cooperated with that die for cutting extrudate into pieces as the mash passed through the die. However, this earlier arrangement has little ability to form shapes which accurately simulate the shape of a natural food piece, and, as a result, the art moved toward the more modern die and cutter arrangement.

In this latter regard, U.S. Pat. No. 2,676,552, issued on Apr. 27, 1954, shows the generally modern arrangement of such die and cutter assemblies and is incorporated herein by reference. In that patent, an inner sleeve forms a conduit for the mash and an outer sleeve forms the cutter for cutting the extrudate (mash) into individual pieces, but at the end of the inner sleeve, a disk is disposed so that the die so formed is circular in configuration and can, therefore, extrude and cut a shape in the form of doughnut. The outer sleeve is reciprocated on the inner sleeve by contact with shoulders on the inner sleeve which form bearing surfaces for the reciprocal motion of the outer sleeve.

While this approach is quite appropriate for simulating the shape of a food product piece in the form of an annular ring, e.g. a doughnut shape, this approach is not capable of producing more complicated shapes and the art proposed modifications of the basic process and die and cutter assembly, as briefly described above, to achieve more complex shapes. A notable example thereof is U.S. Pat. No. 4,080,137, issued on Mar. 21, 1978, which disclosure is incorporated herein by reference. This patent describes in more detail the basic overall process of the extruder, as briefly described above, and more particularly shows such a die and cutter assembly where the die is not formed at the end of the inner sleeve but in a side wall of the inner sleeve near the end of the inner sleeve. By so forming the die in that side wall, and by cooperation with the reciprocal outer sleeve cutter, the arrangement is capable of producing a shape with an arcuate top and a substantially flat bottom which can simulate miniature chicken parts.

This technology has been followed in the prior art for making other shapes, and U.S. Pat. No. 4,152,102, issued on May 1, 1979, shows an adaptation of that process for making a shape simulating a fried shrimp. This patent also describes in more detail certain aspects of the prior art process, including the gelling agent and gelling step, and this patent is incorporated herein by reference. In the process of that patent, again, a discharge of the extrudate from a side wall is used, but in the die there is a former which allows the extrudate to assume a curved shape, similar to the curved shape of a fried shrimp.

In all of these processes, however, a common difficulty is that, as the extrudate exits the die and is cut by the cutter assembly, that cutter assembly makes a relatively flat cut of the extrudate, and the extrudate has generally flat edges, i.e. resulting from a present cut and from a preceding cut of the cutter assembly. This difficulty is clearly shown in the drawings of U.S. Pat. No. 4,152,102, especially at FIG. 9. Obviously, a French fried shrimp does not have opposed flat surfaces, but, instead, is rounded, and that approach for extruding the food piece leaves an undesirable appearance to the food piece, which appearance is not that which would be expected by a consumer in regard to a French fried shrimp.

The above state of the prior art has existed until the present time, and, therefore, in connection with extruded pieces having complex or rounded shapes, the art simply has not been able to duplicate the shape of the natural piece with any degree of accuracy. Accordingly, in such complex shapes, such as that of a French fried shrimp, it is quite obvious to the consumer that the piece is a molded piece and not at all similar to the shape of a natural piece. This has a negative effect on the consumer and one which the art would most hopefully avoid.

In more detail of the prior art extruder, that apparatus entails a pressure vessel for containing the ground mash of the food. Pressure is exerted in the pressure vessel by a pressure exerting device which can be any device to exert pressure on the mash, e.g. overhead gaseous pressure, pump pressure, mechanical pressure, e.g. a piston, and the like, and no particular form of pressure exerting device is required. A manifold is in fluid communication with the pressure vessel and at least one, but usually a number of, die and cutter assemblies are in fluid communication with the manifold, such that the pressurized mash in the pressure vessel flows through the manifold and into the die and cutter assemblies.

Each die and cutter assembly has an elongated, annular tubular member with a tubular extrusion wall (essentially the inner sleeve of the prior art, as noted above), a closed extrusion end, an opened feed end attachable in fluid communication to the manifold, at least one extrusion die formed in the tubular extrusion wall near the extrusion end (essentially the side wall of the inner sleeve of the prior art), a tubular cutter having an opened driveable end, and an elongated cutter wall with an opened cutter end with at least one cutting surface for cutting the extrudate into the shape as the extrudate exits the die. That cutter is disposed at least partially over and reciprocally slideable on the tubular extrusion wall (essentially the same as the inner sleeve of the prior art) and operably connected at the driveable end to a drive device for reciprocally sliding the cutter member over and away from the die. The drive device can be any device for reciprocably moving the cutter member, e.g. mechanical, electrical, and fluid-operated devices. This arrangement is particularly shown in U.S. Pat. No. 4,080,137, noted above, and the conditions and parameters of such apparatus are well known in the art and need not be repeated herein.

It would be, of course, a decided advantage in the art to improve upon such apparatus such that the apparatus is capable of extruding complex shapes which simulate the shape of natural food pieces in all aspects of the shape and which do not have, for example, the opposed flat surfaces of the prior art, as mentioned above. It would a further advantage to extrude complex shapes where the shapes are rounded in any or all desired directions, e.g. such as the rounded shape of a curved fried shrimp or the rounded shape of a simulated chicken drumstick.

SUMMARY OF THE INVENTION

It has now been found that the above-described prior art apparatus can be modified to provide such rounded shapes so as to accurately simulate the shape of a natural food piece. The invention is based on three primary discoveries and several subsidiary discoveries.

As a first primary discovery, it was found that the extrusion die of the prior art must have a shape generally configured to a cross-sectional shape of the natural food piece to be extruded, but which die must also be configured so as to provide a substantially constant transverse flow rate of the mash through the die at substantially all portions of the die.

As a subsidiary discovery in this regard, it was found that the natural shape of the food piece cannot be slavishly copied in forming the die when that die shape results in less than a substantially constant transverse flow rate of the mash through the die at substantially all portions of the die.

As a further subsidiary discovery, it was found that by experimental deviations in the die shape from the true natural shape of the food piece, the extruded piece could, nonetheless, closely simulate the shape of the natural food piece, while at the same time providing a substantially constant transverse flow rate of the mash through the die at substantially all portions of the die. By shaping the die in such a manner, the extruded piece simulates the shape of a natural food piece, while at the same time provides that the extruded piece has the rounded shape of the natural piece and not the prior art distorted shape.

As a second primary discovery, it was found that the cutter member must be reciprocated at speeds sufficient that the cutter member is disposed over the die for a time period that the pressure of the mash in the tubular extrusion wall is not substantially changed during a reciprocation of the cutter member. This is achieved by arranging the drive device and/or the die and cutter assembly so that such reciprocation of the cutter member is provided.

As a subsidiary discovery in this regard, it was found that if the cutter member dwells over the die for time periods such that the pressure of the mash in the tubular extrusion wall is substantially changed, then a subsequent reciprocation of the cutter member and the extrusion of a further cut food piece results in the food piece not having the desired shape.

As a third primary discovery, it was found that the cutting surface of the cutter member must be generally configured to a shape which is substantially the shape of at least the first one-quarter of the die first encountered by the cutting surface when cutting a food piece. Other shapes, such as the generally flat cutting surface of the prior art, when encountering the first portion of the die in a reciprocal action, cut too much of the extrudate near that first encountered portion before remaining portions of the extrudate are cut. This caused a distortion in the shape of the extrudate. However, by configuring the cutting surface to a shape which is substantially the shape of at least the first one-quarter of the die first countered by the cutting surface, a significantly greater amount of extrudate is cut at the same time, and this avoids that distortion in the extruded and cut shape.

Thus, briefly stated, the present invention is an improvement in an extruder for producing an extruded food piece in a shape which simulates the shape of a natural food piece. Such conventional extruders comprise a pressure vessel for containing a mash of the food under pressure, a pressure exerting device for maintaining a pressure in the pressure vessel, a manifold in fluid communication with the pressure vessel, and at least one die and cutter assembly in fluid communication with the manifold. The die and cutter assembly has (a) an elongated annular extrusion member with a tubular extrusion wall, (b) a closed extrusion end, (c) an opened feed end attached in fluid communication to the manifold, (d) at least one extrusion die formed in the tubular extrusion wall near the extrusion end, and (e) a tubular cutter member having an opened driveable end, an elongated cutter wall and an opened cutter end with at least one cutting surface for cutting extrudate into the shape as the extrudate exits the die. The cutter member is disposed at least partially over and reciprocally slideable on the tubular extrusion wall and operably connected at the driveable end to a drive device for reciprocally sliding the cutter member over and away from the die.

The present improvement in that known extruder is where the extrusion die has a shape generally configured to a cross-sectional shape of the natural food piece but which die is also configured so as to provide a substantially constant transverse flow rate of the mash through the die at substantially all portions of the die. The drive device is arranged to reciprocate the cutter member at speeds sufficient that the cutter member is disposed over the die for a time period such that a pressure of the mash in the tubular extrusion wall is not substantially changed during a reciprocation of the cutter member. The cutting surface shape is generally configured to a shape which is substantially the shape of the at least first one-quarter of the die first encountered by the cutting surface when cutting a food piece.

BRIEF DESCRIPTION OF THE DRAWINGS

FIG. 4 is a side elevation of an extrusion member removed from the tubular cutter member for clarity purposes;

FIG. 5 is a side elevation of a cutter member removed from the extrusion member for clarity purposes;

DESCRIPTION OF PREFERRED EMBODIMENTS

Figure 1:
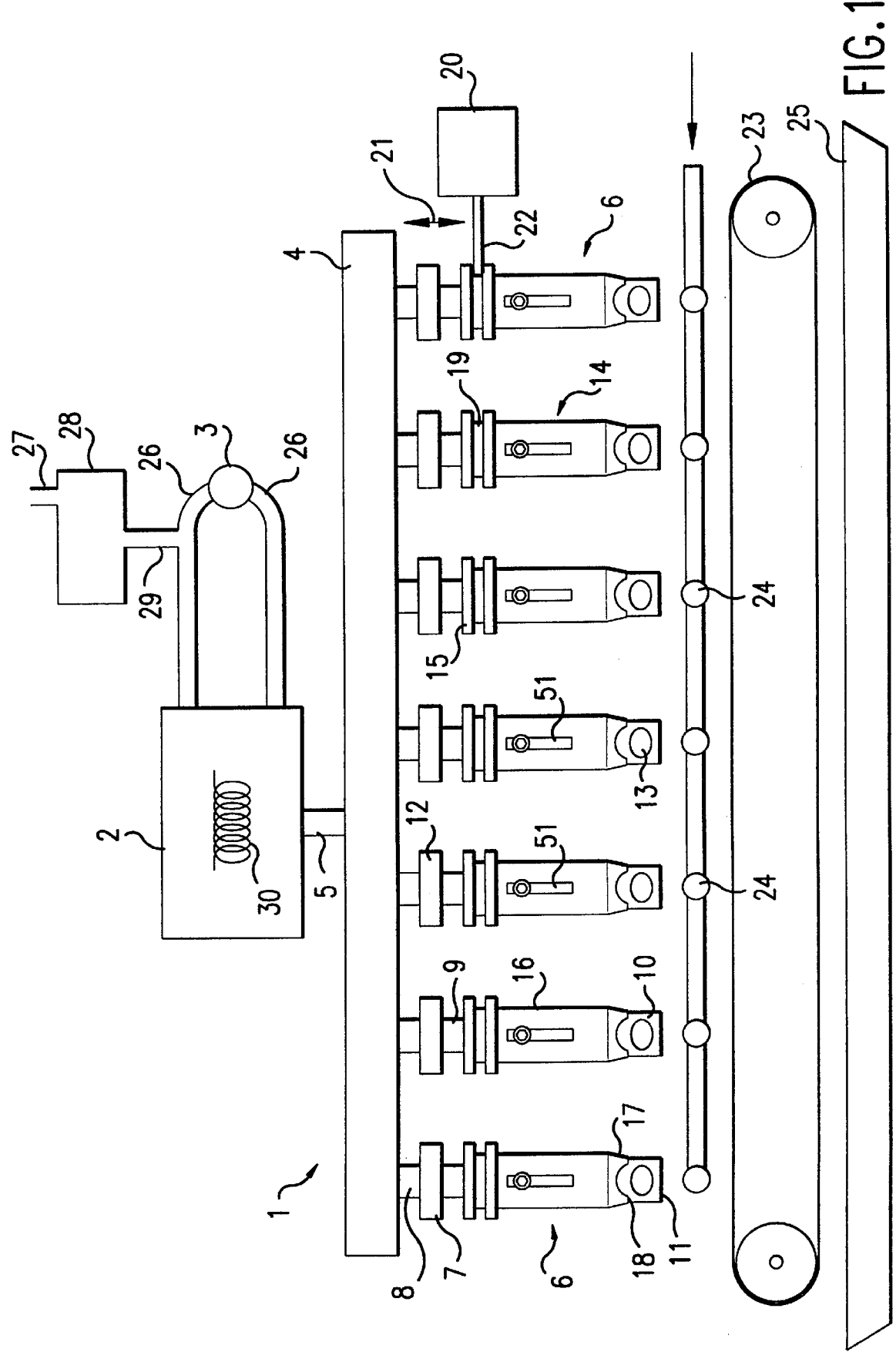
FIG. 1 is a diagrammatic illustration of an extruder useful in the present invention, with some of the parts being those of the prior art arrangement and with some of the parts being aspects of the present invention.

The overall extruder of the present invention is shown in FIG. 1. Since many of the components of that extruder are known in the prior art, FIG. 1 is only in diagrammatic form, for conciseness.

As shown in FIG. 1, the extruder, generally 1, has a pressure vessel 2, a pressure exerting device 3 for maintaining a pressure on the pressure vessel 2, a manifold 4 in fluid communication (conduit 5) with the pressure vessel 2. There is at least one die and cutter assembly 6 (seven being shown in FIG. 1). It will be noted that the die and cutter assembly 6 is in fluid communication with the manifold 4 by way of an attachment 7 to a nipple 8 of the manifold.

Figure 2:
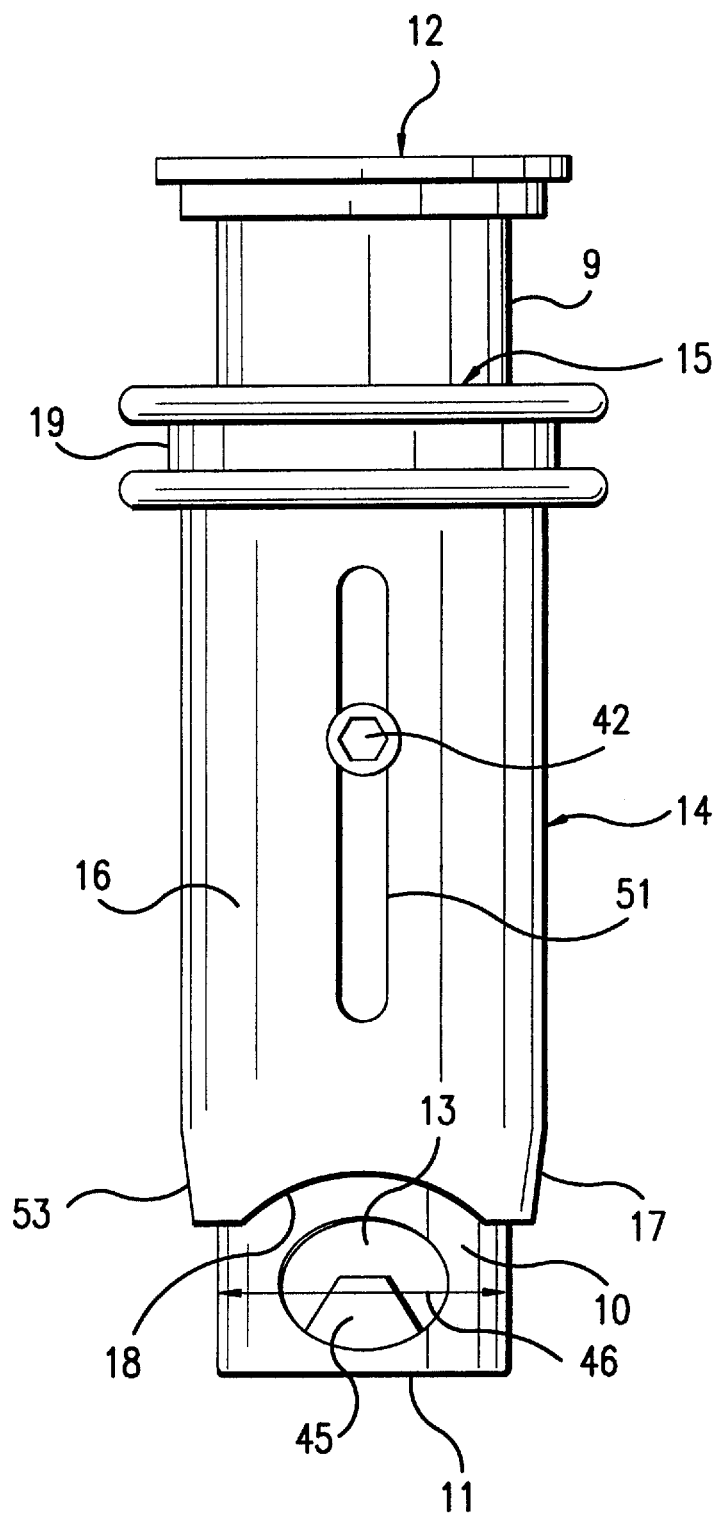
FIG. 2 is a side elevation of a die and cutter assembly useful in the present invention, with some of the parts being those of the prior art arrangement and some of the parts being aspects of the present invention.

The die and cutter assembly 6 is best understood from both FIGS. 1 and 2. A die and cutter assembly has an elongated annular extrusion member 9 with a tubular extrusion wall 10, a closed extrusion end 11, and an open feed end 12 attached in fluid communication, e.g. by nipple 8, to manifold 4. There is also at least one extrusion die 13 formed in the tubular extrusion wall 10 near the extrusion end 11. A tubular cutter member 14 has an opened driveable end 15, an elongated cutter wall 16 and an opened cutter end 17 with at least one cutting surface 18 for cutting extrudate into a shape as the extrudate exits the die 13. The cutter member 14 is disposed at least partially over and reciprocally slideable on the tubular extrusion wall 10 and operably connected at a drive end 19 to a drive device 20 (see FIG. 1) for reciprocally sliding, as indicated by arrows 21, the cutter member 14 over and away from die 13. The cutter wall 16 is so reciprocated by a drive device, e.g. a drive arm 22, and details of such a drive arm may be found in U.S. Pat. No. 4,080,137, which disclosure is incorporated herein by reference.

As extrudate passes through die 13 and is cut by cutter wall 16 having a cutting surface 18, the cut extrudate falls onto a moving conveyor 23 (see FIG. 1) for collection and for further processing.

Usually, the mash will have a gelling material therein. Thus, as shown in FIG. 1, a gelling agent may be sprayed onto the cut extrudate as it drops to conveyor 23 by passing through a spray of liquid gelling agent produced by a series of sprayers 24 intermediate the die 13 and the conveyor 23. Excess spraying agent is caught by a trough 25.

Figure 3:
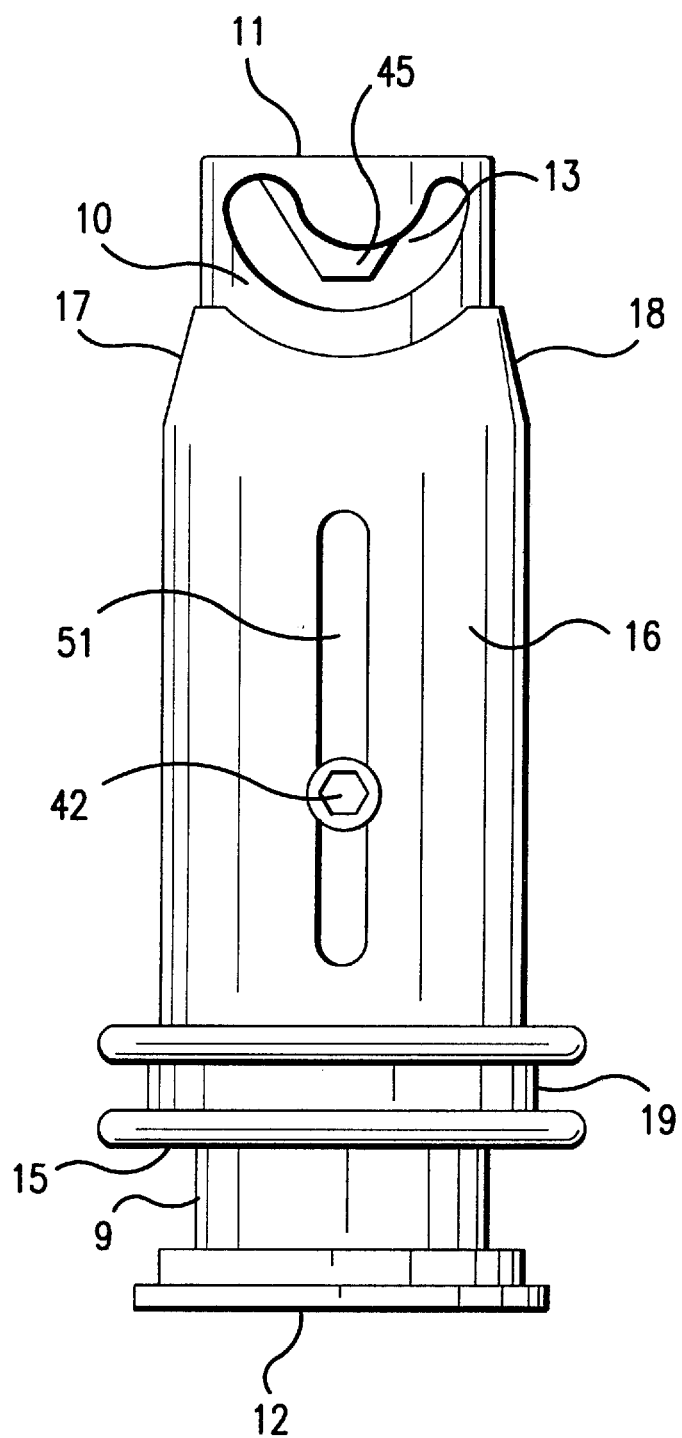
FIG. 3 is a side elevation of a die and cutter assembly according to an embodiment of the present invention.

The present invention centers around the die and cutter assembly 6, although not exclusively, and an embodiment of the invention is shown in FIGS. 3 through 5, although similar parts of the die and cutter assembly are also shown in FIGS. 1 and 2. The extrusion die 13 of the present invention has a shape generally configured to a cross-sectional shape of a natural food piece, and in the embodiment illustrated in FIG. 3, the shape is that of a natural fried shrimp. However, in addition to having the general shape of that natural food piece, e.g. the fried shrimp, the die must also be configured so as to provide a substantially constant transverse flow rate of the mash through the die at substantially all portions of the die. This is diagrammatically illustrated in FIG. 6, where a portion of extrusion wall 10 has extrusion dies 13 therein, again shaped like a fried shrimp natural piece, and the solid arrows illustrate that the flow rate of the mash through the left-hand die is substantially constant at substantially all portions of the die.

Figure 6:
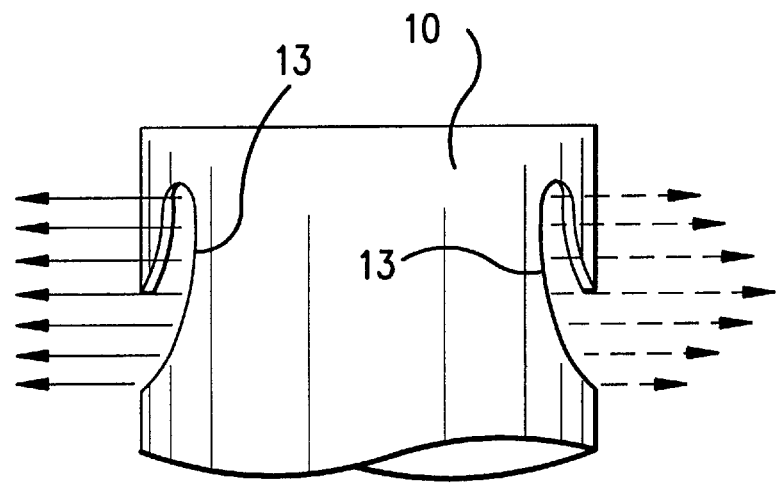
FIG. 6 is a diagrammatic illustration of substantially constant transverse flow rate through a die.

As can be appreciated, if the mash is not provided with a substantially constant flow rate through the die at substantially all portions of the die, the extrudate would tend to curve and deviate from the natural shape, as shown by the dashed arrows issuing from the right-hand die in FIG. 6.

Determining the exact cross-sectional shape of the die requires some experimentation, and, generally, the cross-sectional shape of the die will not vary greatly from the cross-sectional shape of the natural food piece. For example, as shown in FIG. 4, the cross-sectional shape of the die fairly closely approximates the cross-sectional shape of the natural food piece being extruded, i.e. a fried shrimp. However, from desired natural food piece to desired natural food piece, deviations from that true cross-sectional shape will be required to ensure the substantially constant flow rate of mash through the die at substantially all portions of the die. This experimentation is easy to achieve, since, by observing the shape of an extruded piece and comparing with the natural shape, deviations from the natural shape can easily be observed and modification of the die at those deviations can be made. When the cut extrudate is in substantially the same shape as the natural food piece, then the transverse flow rate of the mash through the die is substantially constant at substantially all portions of the die.

As will also be appreciated, the flow rate of the mash through the die will depend on the pressure of the mash in tubular extrusion wall 10. In turn, the pressure of the mash in tubular extrusion wall 10 will depend upon the pressure of the mash in pressure vessel 2, the pressure of the mash in manifold 4, and the flow rate through all of these. As can best be appreciated from FIG. 1, if all of the dies 13 are open at the same time, a considerable amount of mash would extrude therethrough and the pressure in each tubular extrusion wall 10 would quickly drop. Further, as the mash exits die 13 (see FIGS. 2 and 6), there will be a local pressure drop at the die 13. To minimize that local pressure drop at the die 13, so that the substantially constant flow rate of mash through the die can be provided, the drive device 20 (see FIG. 1) must be arranged to reciprocate the cutter member 14 at speeds sufficient that the cutter member 14 is disposed over the die for a period of time that the pressure of the mash in the tubular extrusion wall 10 is not substantially changed during a reciprocation of the cutter member. By so reciprocating the cutter member 14, excess pressure does not build in tubular extrusion wall 10 and, at the same time, by so reciprocating the cutter member 14, the die is open for extrusion for such a time that a local pressure drop of the mash at the die does not substantially occur. All of this promotes a substantially constant flow rate of the mash through the die at substantially all portions of the die. Further, by arranging a drive device 20, e.g. arm 22, for each die and cutter assembly 6, the opening of each die may be staggered to prevent a sudden pressure drop of the mash.

Figure 7:
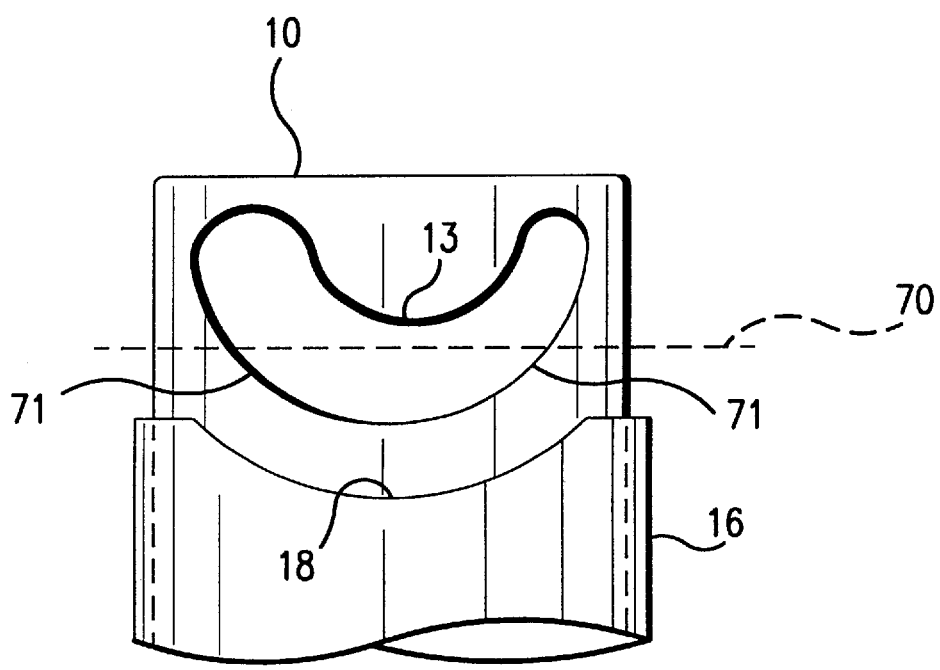
FIG. 7 is a partial side elevation showing a cutting surface configured to at least the first one-quarter of the die first encountered by the cutting surface when cutting the extrudate.

Another important feature to ensure that the extruded piece is in the substantial shape of the natural food piece, is that the cutting surface 18 (see FIGS. 2 and 5) is generally configured to a shape which is substantially the shape of the at least first one-quarter of the die 13 first encountered by the cutting surface 18 when cutting the extrudate into a food piece. FIG. 7 illustrates this feature where the die 13 in extrusion wall 10 has indicated thereon a dashed line 70 which approximates the first one-quarter of the die first encountered by the cutting surface 18 of cutter wall 16. It will be seen that the cutter surface 18 is generally configured to a shape which is substantially the shape of that at least first one-quarter of the die 13 encountered by the cutter surface 18 when cutting the extrudate into a food piece.

By so configuring the cutting surface to that at least first one-quarter of the die shape, it can be ensured that, as the cutting of the extrudate commences, the cutting takes place over a large portion of the lowermost part 71 of the die and that the cutting commences over a wider area of that lowermost part, i.e. at least the first one-quarter thereof. This is opposed to a flat cutter surface 18 which was used in the prior art or even a somewhat slightly curved cutting surface 18 (see FIG. 2) which has also been known.

It is preferable that more than at least the first one-quarter of the die is contacted by the configured cutting surface 18, e.g. one-third or even one-half, but this is not always practical for all shapes that may be desired with extrusion die 13. Nevertheless, if at least the first one-quarter of the die encountered by the cutting surface 18 is generally configured to that shape, this will be sufficient to produce a cut extrudate closely simulating the shape of a natural food piece, especially when practiced with the substantially constant flow rate of the mash through the die at substantially all portions of the die, and the reciprocation of the cutter member, as explained above.

All of the above help in maintaining a substantially constant flow rate of the mash through the die at substantially all portions of the die and prevent distortions of the cut piece so as to produce a rounded piece. The substantially constant flow rate will, in part, depend on maintaining a substantially constant pressure in the pressure vessel 2, which pressure is provided by a pressure exerting device 3 (see FIG. 1) While that pressure exerting device might be any device, e.g. a gas pressure such as compressed air or the like, it is preferred that the pressure exerting device 3 is a pump in recirculating conduit 26 (see FIG. 1) for continuously recirculating the mash from pressure vessel 2 through pump 3 and back into pressure vessel 2 so as to maintain a constant pressure of the mash in pressure vessel 2. When the pump is disposed in a recirculating conduit for the pressure vessel, that pressure can be very carefully and consistently controlled. This is especially true where the pump is a positive displacement pump, which is the preferred embodiment of the invention.

While the foregoing will maintain a substantially constant pressure on the extruder system, i.e. the pressure vessel 2, the manifold 4 and the die and cutter assemblies 6, a local pressure differential may occur during a reciprocation of cutter wall 16. For example, if that cutter wall 16 remains over die 13 for a sufficiently long time, the pressure of the mash in extrusion wall 10 will, of course, increase. On the other hand, if the cutter wall 16 remains over the extrusion die 13 for only a short period of time, the extrusion die is substantially open most of the time and there can be a pressure decrease of the mash in extrusion wall 10. There is, therefore, an intermediate situation where the cutter member 14 is reciprocated fast enough but not so fast over the die that the pressure of the mash in tubular extrusion wall 10 is not substantially changed during a reciprocation of the cutter member, as explained above.

While this will vary with the mash, the temperature of the mash and the pressure, for most situations it has been found that the cutter member 14 should be reciprocated over the die 13 at a rate of between about 60 and 800 cycles per minute, and more preferable at a rate between about 150 and 700 cycles per minute, with between about 300 and 600 cycles per minute being the most usual for, most mashes and most temperatures with most die shapes. This will ensure such constant pressure. Such number of reciprocations, especially in the higher numbers of cycles per minute, can cause substantial difficulties with bearings between the extrusion wall 10 and cutter wall 16, and for this reason, special bearings may be required, as disclosed below.

In regard to the pressure at the die, as explained above, the viscosity of the mash should be relatively constant, and to keep the viscosity of the mash relatively constant, the temperature of the mash should also be kept relatively constant. To this end, the extruder may be provided with a temperature control device, e.g. a heating device and/or cooling device 30 (see FIG. 1) for maintaining the temperature of the mash in the pressure vessel at a relatively constant temperature. While control device 30 has been shown in pressure vessel 2 for illustrative purposes only, that control device 30 could be outside of the pressure vessel. For example, a control device may be disposed in the manifold or outside the manifold or in the pressure vessel. The control device may be a heating device, such as an electrical heating device or a steam coil or a hot liquid coil or infrared heater rods or the like, or a cooling device, such as a chilled water coil, so as to ensure that the temperature is controlled and maintained. In the most preferred embodiment where a positive displacement pump 3 is used in a recirculating line 26, the positive displacement pump, by the mechanical action thereof, will add energy (heat) to the recirculating mash. Thus, the heating device may be, at least in part, the positive displacement pump disposed in the recirculation conduit of the pressure vessel. Since that positive displacement pump can be operated relatively continuously, it can supply the energy to the recirculating mash for use in maintaining a desired temperature. This is especially true in view of makeup feed to the extruder. In a typical extruder, makeup feed is passed through feed pipe 27 (see FIG. 1) into grinder or mash former unit 28 and through pipe 29 into recirculation conduit 26. This will allow the feed makeup to immediately be effected by the heat energy input of the positive displacement pump and help to maintain a desired temperature of the mash. On the other hand, for the same reason, too much energy (heat) may be added to the mash, and to maintain a desired temperature, the temperature control device may be, at least in part, a cooling device.

As shown in FIG. 1, there may be multiple die and cutter assemblies 6 (seven being shown in FIG. 1). However, that number can vary widely from only one die and cutter assembly to fifty die and cutter assemblies, but more usually that number is between about five and twenty, and more usually between about five and fourteen.

Figure 8:
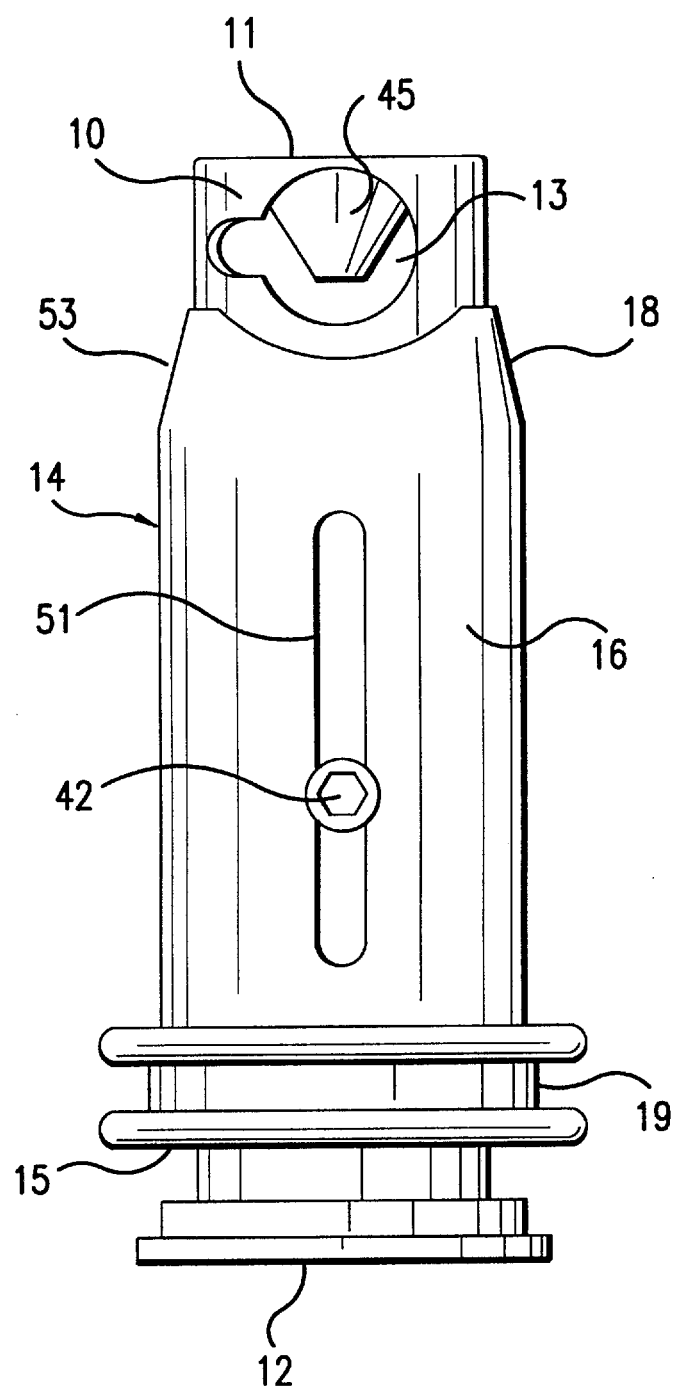
FIG. 8 is a side elevation of a further embodiment of a die and cutter assembly according to the present invention.

As shown in FIG. 4, the extrusion wall 10 may have multiple dies 13 therein. With larger cross-sectional shapes of the die, the number of dies will be reduced, while, on the other hand, with smaller cross-sectional shapes of the die, the number of dies can be increased. Normally, however, the dies will be not more than four in any one extrusion wall 10 but three dies can usually be accommodated, although with larger simulated food pieces, in order to avoid local pressure drop as noted above, only one die will be included in the extrusion wall 10. FIG. 8 illustrates the same where there is only one die 13 in extrusion wall 10, since that die 13 simulates a small chicken drumstick and is so large that multiple dies 13 in extrusion wall 10 would very substantially decrease the pressure of the mash in extrusion wall 10 when the die is open.

As seen in FIG. 4, the outside surfaces, generally 40, of extrusion wall 10 have at least one bearing surface 41 upon which the cutter member 14 is reciprocally slid. FIG. 4 shows two such bearing surfaces, but one or up to about ten such bearing surfaces, or more, may be used. These bearing surfaces 41 snugly fit the inside surface 50 (see FIG. 5) of cutter member 14 so as to have a precise slide and cutting action when reciprocated over die 13.

While these bearing surfaces may be simply machined portions on extrusion wall 10 or on the inside surface of tubular cutter member 14, they may also be separate bearings made of special bearing material to increase the life of the bearings, e.g. bearing grade steel, oil-impregnated sintered bearings, and the like. However, at the higher number of reciprocating cycles per minute as discussed above, especially at about above 350 cycles per minute, usual bearing materials have a relatively limited life before wear loosens the bearings and a snug slide between extrusion wall 10 and cutter member 14 is no longer possible. Thus, especially for the higher number of cycles per minute, it is most preferred that the bearings are constituted by a bearing plastic sleeve mounted into the insider surface 50 of cutter member 14. Such sleeve can be so mounted in a number of ways, but preferably the cutter member 14 has a recess formed in the inside surface 50 thereof. After placing the sleeve into that recess, the inside diameter of the sleeve is formed, e.g. bored or machined, to a precise dimension which is, for example, only $\frac{1}{10,000}$ inch greater than the outside diameter of extrusion wall 10. This provides an extremely close tolerance for the bearing, and with an engineering plastic (one which has abrasion resistance, high strength and high incompressibility), e.g. materials such as HYDEX, reciprocations of 500 to 800 cycles per minute can be sustained for many days without the bearings loosening. The bearing sleeve may be held in the recess by any conventional means such as a shoulder or retention ring.

Figure 13:
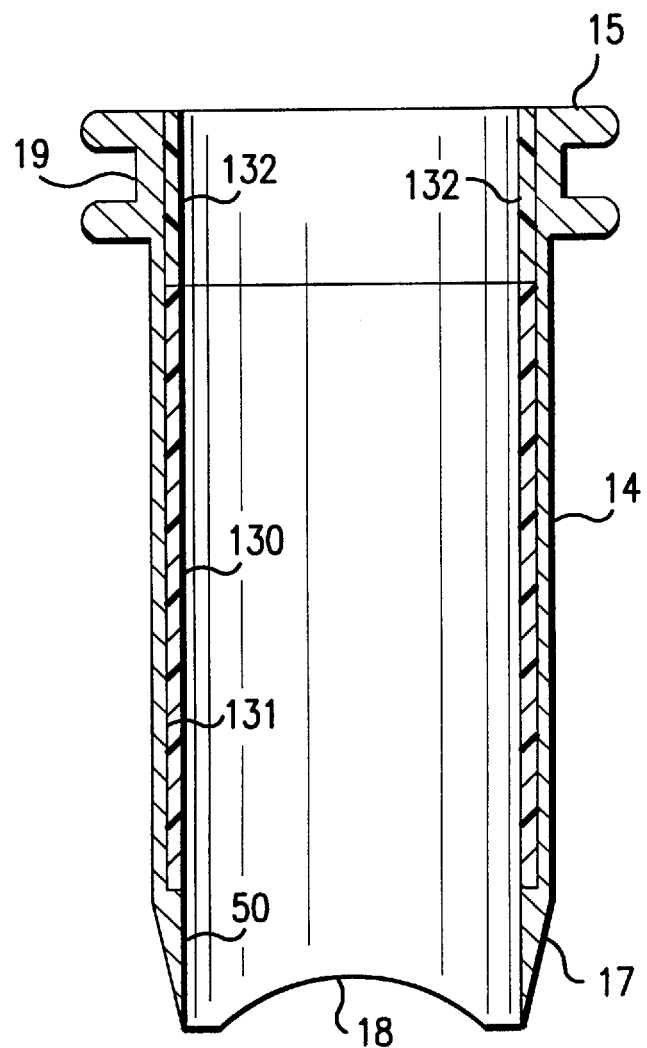
FIGS. 13 is a cross-sectional view of the cutter member having a plastic bearing disposed on an inside wall thereof.

FIG. 13 shows an example of such a bearing plastic sleeve 130 disposed in a recess 131 on the inside wall 50 of cutter member 14. The plastic sleeve may be held within recess 131 by a shoulder or retention ring 132.

In order to provide that the shaped cutting surface 18 (see FIG. 5) is in register with the shape of die 13, at least in the first one-quarter of that die encountered by the cutter surface 18, as explained above, a slot 51 (see FIGS. 5 and 2) is provided in tubular cutter member 14 and an upstanding protuberance, e.g. a stud, 42 (see FIGS. 4 and 2) is attached to extrusion wall 10 and projects through slot 51. Thus, when the cutter wall 16 has an axial slot 51 and the extrusion wall 10 has an upstanding protuberance 42 (e.g. the stud 42) disposed within that slot, the cutting surface remains in register with the extrusion die. The simplest form of keeping the cutting surface in register with the extrusion die is that of the stud 42 being threadedly engaged into the extruder wall 10, but, obviously, many other equivalent mechanical devices could be used to achieve the same result, e.g. a key and slot arrangement, a guide and pin arrangement, and the like.

A most preferred form of the invention is where in the closed extrusion end 11 has an at least partially conical extrudate divertor 45 (see FIGS. 4 and 2) projecting into the annulus of the tubular extrusion wall 10 and extending at least to a diameter 46 (see FIGS. 4 and 2) of the extrusion wall 10 lying within the extrusion die 13. Most preferably, that divertor 45 is in a truncated conical shape.

The purpose of the divertor is to encounter the mash flowing through extrusion wall 10 and diverting that main flow from an essentially axial flow to a substantial transverse flow whereby the mash encounters the die 13 in a transverse direction so as to decrease turbulence of the mash passing through the die. With this decreased turbulence of the mash, a more uniform and predictable shape of the extrudate is provided.

In reciprocation of the cutter member 14 over extrusion wall 10, whereby the extrudate is cut, it is important for that cut to be complete so as to avoid any stringers between cut pieces of the extrudate. To this end, it is most preferable that the cutter wall 16 has a length sufficient such that a leadingmost edge of the cutting surface 18 extends beyond the closed extrusion end 11 when the cutter wall is slid to a furthest extension of a reciprocating movement. By such extension of the cutting surface 18 beyond the die 13, it will be ensured that there are no stringers between successive cut extrudates. However, to completely ensure this lack of stringers, it is most preferred that a trailingmost edge of the cutting surface 18 also extends beyond the closed extrusion end 11.

Of course, when there are multiple dies, e.g. at least two dies, in the extrusion wall, there must be a corresponding number of cutting surfaces, e.g. two, on the cutter wall. There must be a cutting surface for each extrusion die, and those cutting surfaces must be kept in register with the die, e.g. with the stud, pin or the like, as explained above. Also, in order to avoid any stringers and the like, it is preferable that one of the bearing surfaces 41 (see FIG. 4), when used, is also the portion of the extrusion wall 10 where the dies 13 are configured. Since the bearing surfaces will have the at least one die disposed therein, and since the bearing surfaces most snugly fit within the inside surface 50 of tubular cutter member 14, this will also help eliminate any stringers.

There are also a number of other means of ensuring the desired flow of the mash through the die so that the extruded food piece is in a shape which simulates the shape of a natural food piece. Thus, where the divertor 45 extends into the annulus of the tubular extrusion wall 10 such that the smallest end of the divertor lies on the diameter 46 which is approximately equidistant between opposite axial edges 47, 48 (see FIG. 4) of the die, a maximum diversion of the mash from the axial flow to the transverse flow, as discussed above, will be achieved, and this will optimize the accuracy of duplicating the natural shape. In addition, the cutting surface 18 may be at least in part tapered in the axial direction, as shown by the taper 53 in FIGS. 5 and 8. Further, where the extrusion wall 10 and the cutter wall 16 have a circular cross-section, this will facilitate any pressure drop caused by flow of the mash therethrough and improve the accuracy of the extrudate shape. However, if desired, the extrusion wall 10 and the cutter wall 16 may have other shapes, such as square, rectangular, oval and polyhedral shapes. Any shape other than a circular shape, i.e. circular cross-section, will not require the protuberance 42, since such shapes will be self-aligning and, in that sense, are an advantage. However, other than a circular cross-section can cause non-uniform flow of the mash and, therefore, is not preferred.

Figure 9:
FIGS. 9 through 12 show the shapes of extrudate according to the present invention and according to the prior art.
Figure 11:
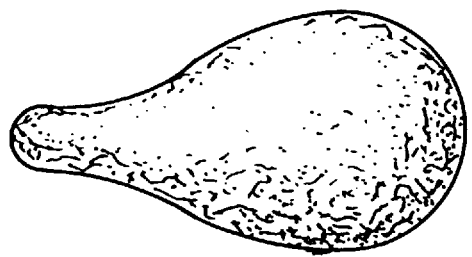
Figure 10:
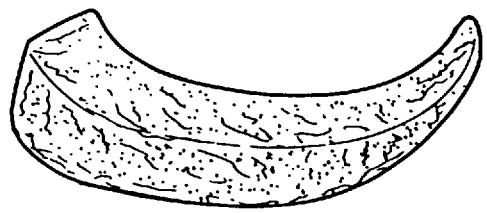
Figure 12:
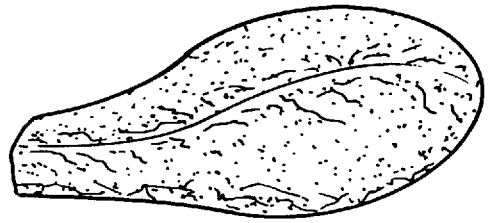

The benefits of the present invention are diagrammatically illustrated in FIGS. 9 through 12. FIG. 9 shows a simulated fried shrimp produced according to the invention, and it will be noted that the configuration is generally that of a shrimp and also is in a rounded configuration as a result of the practice of the invention. FIG. 10, on the other hand, shows a similar extrusion, according to the prior art, as explained above, and it will be noted that the shape is distorted from that of a usual French fried shrimp, and, most importantly, instead of being rounded, the shape is somewhat squarish, which, of course, is not at all like a natural fried piece. The same results are shown in connection with FIGS. 11 and 12, which simulate small chicken drumsticks (see FIG. 8). Here again, the product of the present invention, as shown in FIG. 11, is rounded, while the product of the prior art is somewhat distorted and, again, does not have the rounded shape but something of a squarish shape.

While the foregoing describes the apparatus of the invention in detail, the following are general conditions of using the apparatus in methods for producing the food piece. These conditions can, however, vary widely from mash to mash and are only examples and guides of such conditions.

The mash may be prepared from any food, e.g. meats, poultry, seafood, cereal grains, vegetables, fruits and solid dairy products. As specific examples, the mash may be prepared from beef, chicken, shrimp, wheat, corn, rice, potatoes, apples and cheese. The food is ground to a particle size consistent with forming a fluid mash, e.g. particle sizes that will pass through a U.S. Screen Series No. 5 screen, more usually a No. 10 screen and often a No. 20 screen up to about a No. 100 screen.

Water or other dispersing liquids, e.g. 3% to 70%, may be added to the ground food in order to produce a liquid mash. Binders, flavors, preservatives, colors, stabilizers, antioxidants, and the like may be added to the mash, in conventional amounts. Most often, a gelling material is added to the mash, e.g. a settable gum or pectate, for example, guar gum and sodium alginate, in conventional amounts of about 0.1% to 25%. The gum or pectate is set by a gelling agent, as explained above, e.g. a 0.5% to 10% solution of calcium chloride.

The pressure on the pressure vessel will vary considerably from mash to mash and die to die, but pressures of 1 to 50 psig are normally used, and especially with usual mash temperatures of 25° F. to 50° F.

Also, in the foregoing disclosures, it is stated that certain conditions, configurations, shapes and pressures are not "substantially" changed. In this regard, the term "substantially" means that the change is sufficient to cause a visually noticeable different configuration of the extruded and cut food pieces. For example, it is stated that the die is configured to provide a substantially constant transverse flow rate of the mash through the die at substantially all portions of the die. The term "substantially" in this regard means that the flow rate is such that the extruded and cut food piece does not substantially visually noticeably vary from the desired simulated food piece. The same meaning is also intended for like terms in the specification, e.g. relatively.

Thus, by practice of the present invention, the difficulties of the prior art, as described above, are obviated. It will be recognized that those of ordinary skill in the art can immediately see various equivalents of the present apparatus, for example, in connection with the stud, as well as other places, and it is intended that these obvious variations be within the spirit and scope of the annexed claims.

What is claimed is:

1. In an extruder for producing an extruded food piece in a shape which simulates the shape of a natural food piece comprising a pressure vessel for containing a mash of the food under pressure, a pressure exerting device for maintaining a pressure in the pressure vessel, a manifold in fluid communication with the pressure vessel, and at least one die and cutter assembly in fluid communication with the manifold, said die and cutter assembly having (a) an elongated, annular extrusion member with a tubular extrusion wall, (b) a closed extrusion end, (c) an opened feed end attachable in fluid communication to the manifold, (d) at least one extrusion die formed in the tubular extrusion wall near the extrusion end, and (e) a tubular cutter member having an opened driveable end, an elongated cutter wall and an opened cutter end with at least one cutting surface for cutting extrudate into said shape as the extrudate exits the die, said cutter member being disposed at least partially over and reciprocally slideable on the tubular extrusion wall and operably connected at the driveable end to a drive device for reciprocatably sliding the cutter member over and away from the die, the improvement wherein the extrusion die has a shape generally configured to a cross-sectional shape of said natural food piece but which die is configured so as to provide a substantially constant transverse flow rate of the mash through the die at substantially all portions of the die, the drive device is operable to reciprocate the cutter member at speeds sufficient that the cutter member is disposed over the die for a time period that a pressure of the mash in the tubular extrusion wall is not substantially changed during a reciprocation of the cutter member, and the cutting surface is generally configured to a shape approximating the shape of the at least first one-quarter of the die first encountered by the cutting surface when cutting a food piece.

2. The extruder of claim 1, wherein the pressure exerting device is a pump.

3. The extruder of claim 2, wherein the pump is disposed in a recirculating conduit for the pressure vessel.

4. The extruder of claim 3, wherein the pump is a positive displacement pump.

5. The extruder of claim 1, wherein the cutter member is reciprocated over the die at a rate of between about 60 and 800 cycles per minute.

6. The extruder of claim 5, wherein the rate is between about 150 and 700 cycles per minute.

7. The extruder of claim 6, wherein the rate is between about 300 and 600 cycles per minute.

8. The extruder of claim 1, wherein there is a temperature control means for maintaining the temperature of the mash at a predetermined temperature.

9. The extruder of claim 2, wherein the pressure exerting device is a positive displacement pump disposed in a recirculation conduit for the pressure vessel.

10. The extruder of claim 1, wherein there are multiple die and cutter assemblies.

11. The extruder of claim 1, wherein there are multiple dies in the tubular extrusion wall.

12. The extruder of claim 1, wherein outside surfaces of the tubular extrusion wall has at least one bearing surface upon which the cutter member is reciprocally slideable.

13. The extruder of claim 1, wherein the cutter wall has an axial slot and the extrusion wall has an upstanding protuberance disposed within said slot such that the cutting surface remains in register with the extrusion die.

14. The extruder of claim 13, wherein the protuberance is a stud threadedly engaged in the extrusion wall.

15. The extruder of claim 1, wherein the closed extrusion end has an at least partially conical extrudate divertor projecting into an annulus of the tubular extrusion wall and extending at least to a diameter of the extrusion wall lying within the extrusion die.

16. The extruder of claim 15, wherein the divertor is in a truncated conical shape.

17. The extruder of claim 1, wherein the cutter wall has a length sufficient such that a leadingmost edge of the cutting surface extends beyond the closed extrusion end when the cutter wall is slid to a furthest extension of a reciprocating movement.

18. The extruder of claim 17, wherein a trailingmost edge of the cutting surface extends beyond the closed extrusion end.

19. The extruder of claim 1, wherein there are at least two dies in the extrusion wall and at least two cutting surfaces on the cutter wall.

20. The extruder of claim 12, wherein there are at least two of said bearing surfaces.

21. The extruder of claim 20, wherein one of said bearing surfaces has the at least one die disposed therein.

22. The extruder of claim 15, wherein the divertor extends into the annulus of the tubular extrusion wall such that a smallest end of the divertor lies on a said diameter which is approximately equidistant between opposite axial edges of the die.

23. The extruder of claim 1, wherein the cutting surface at least in part is tapered in the axial direction.

24. The extruder of claim 1, wherein the extrusion wall and the cutter wall have a circular cross-section.

25. The extruder of claim 12, wherein an inside surface of the cutter wall has cross-sectional dimension slightly greater than outer cross-sectional dimensions of the bearing surface such that the cutter wall is snugly slideable on the bearing surface.

26. The extruder of claim 1, wherein there is a plastic sleeve bearing between the extrusion wall and the cutter wall.

27. The extruder of claim 26, wherein the sleeve bearing is made of an engineering plastic.

* * * * *